United States Patent [19]

Idol

[11] Patent Number: 4,491,973

[45] Date of Patent: Jan. 1, 1985

[54] TRANSMITTER TESTING METHOD

[76] Inventor: Charles A. Idol, P.O. Box 8366, Asheville, N.C. 28814

[21] Appl. No.: 403,303

[22] Filed: Jul. 30, 1982

[51] Int. Cl.³ .............................................. H04B 17/00
[52] U.S. Cl. .................................. 455/115; 324/77 B; 324/140 R
[58] Field of Search ............... 455/67, 115; 324/77 A, 324/77 B, 57 N, 57 DE, 58 A, 140 R

[56] References Cited

U.S. PATENT DOCUMENTS 2,678,427  5/1954  Smith ................................... 455/115
2,929,989  3/1960  Hurvitz ............................... 324/57 N

FOREIGN PATENT DOCUMENTS 1173548  7/1964  Fed. Rep. of Germany ...... 455/115

OTHER PUBLICATIONS

"Generador de dos tonos para Blu"–Jose I. Cracovski, Sep. 1981, Revista Telegrafica Electronica, pp. 834, 851-854.

*Primary Examiner*—Marc E. Bookbinder
*Attorney, Agent, or Firm*—Daniel E. McConnell

[57] ABSTRACT

An oscillator apparatus and method for use in determining the linearity of output of a single sideband radio transmitter in which first and second oscillators are provided for generating respective audio tone signals having first and second frequencies. Each oscillator has a tone amplitude control for adjusting the amplitude of the signal produced. The signals are added, combined, and delivered to a transmitter in such a manner as to permit adjustment of oscillator and transmitter performance to a selected fraction of rated output power on each signal alone. Such adjustment makes possible a determination of linearity as described in the specification.

7 Claims, 4 Drawing Figures

TRANSMITTER TESTING METHOD

FIELD AND BACKGROUND OF THE INVENTION

Single sideband radio transmitters are widely used in a range of radio communications applications. By way of example only, such transmitters are used by amateur radio operators, as well as by commercial radio communication systems and by the military. In all such applications of single sideband communication, it is desirable that the transmitter (including any linear amplifier used) be as free from distortion as possible. A system that introduces distortion may cause extraneous sidebands to be produced, creating interference with other services outside the normal radio channel, in addition to causing distortion of the transmitted signal.

Ideally, a single-frequency audio tone applied to the input of the transmitter should produce a single radio-frequency signal output from the transmitter. In a similar manner, two different audio tones, when applied simultaneously to the input of a transmitter, should produce only two radio-frequency signals out of the transmitter. However, in the presence of non-linearity in the transmitter, two discrete tones applied to the input may result in a variety of output radio frequencies, the amplitudes and frequencies of which are dependent upon the degree of non-linearity of the transmitter.

Heretofore, it has been proposed that two-tone generators may be employed for single sideband testing. Various devices for generating first and second audio tone signals having frequencies generally within the frequency range of human speech have been known and used heretofore. However, such testing as done prior to the present invention has been subject to limitations caused by difficulty in observing and interpreting an oscilloscope presentation of the transmitter output. For a variety of reasons recognizable to persons of appropriate skill in the applicable arts, such an oscilloscope display shows only relatively large amounts of non-linearity, and dependence upon the oscilloscope alone can result in the transmitting equipment being operated with significant non-linearity.

BRIEF DESCRIPTION OF INVENTION

With the foregoing particularly in mind, it is an object of the present invention to provide an apparatus and method for use in determining the linearity of output of a single sideband radio transmitter. In realizing this object of the present invention provision is made for independently adjusting the amplitude of first and second audio tone signals in such a manner as to assure that transmitter linearity is accurately determined.

Yet a further object of the present invention is to provide a method of determining the linearity of output of a single sideband radio transmitter by a sequence of steps in which a first audio tone signal is generated and delivered to a transmitter, the amplitude of the first signal is adjusted until the transmitter is monitored as generating a selected fraction of its rated power output, the generation of the first signal is then stopped while a second signal is generated and delivered, the amplitude of the second signal is adjusted until the transmitter again supplies the same selected fraction of its rated power output, and both of the adjusted signals are then applied. When the two adjusted signals are applied, the transmitter will indicate its degree of linearity by the extent to which the power output produced is substantially twice that of the selected fraction.

BRIEF DESCRIPTION OF DRAWINGS

Some of the objects of the invention having been stated, other objects will appear as the description proceeds, when taken in connection with the accompanying drawings, in which—

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
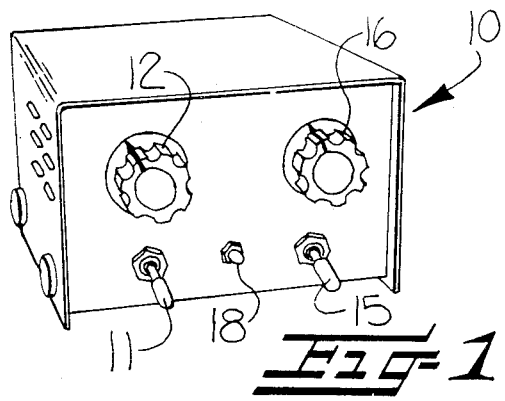
FIG. 1 is a front perspective view of an apparatus in accordance with the present invention.
Figure 2:
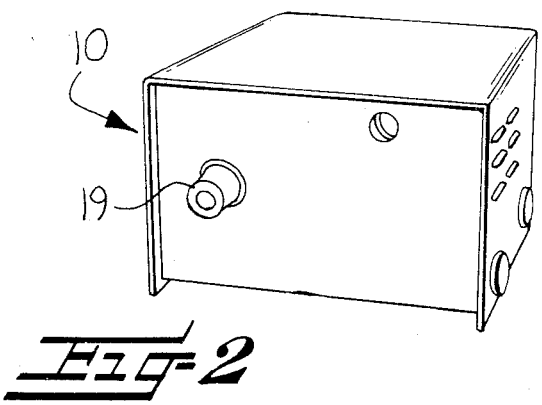
FIG. 2 is a rear perspective view of an apparatus in accordance with the present invention.

Referring now more particularly to the accompanying drawings, FIGS. 1 and 2 are front and rear perspective views of an apparatus in accordance with the present invention as assembled for use. The apparatus is contained within an appropriate housing, generally indicated at 10, from which protrude a first oscillator on-off switch 11 and amplitude control 12, a second amplifier on-off switch 15 and amplitude control 16, an indicator LED 18, and an output connector 19.

In order to provide supply voltage of desired polarities, the circuitry contained within the housing 10 includes a power supply circuit operatively connected with a battery generally indicated at 20. Current from the battery is switched through one section of the two on-off switches 11, 15 and is then supplied, through a pair of resistors, to a voltage follower 21 for supply to oscillator circuits and an adder circuit to be described hereinafter.

A first oscillator means contained within the housing 10 includes resistors and capacitors connected with an operational amplifier generally indicated at 22. By an appropriate selection of the elements, the first oscillator means thus provided functions for generating an audio tone signal having a first frequency. That frequency may, in one example of a circuit in accordance with the present invention, be on the order of 1300 Hertz. The frequency is not critical, as the exact frequencies are determined by the resistors and capacitors in a phase shift network. The oscillator is operated at minimum gain, so that the circuit oscillates near the edge of oscillatory gain and low distortion output is generated. The audio tone signal generated by the oscillator is passed through the first tone amplitude control means in the form of a potentiometer 12 and is delivered to an adder generally indicated at 24 and as described more fully hereinafter.

A second oscillator means constructed and operating in generally the same manner as the first oscillator means generates an audio tone signal having a second frequency. The second oscillator means includes an operational amplifier generally indicated at 25 and components similar to those of the first oscillator. In one operating embodiment of the present invention, the frequency generated by the second oscillator means is on the order of 1800 Hertz. The second signal frequency is also delivered to the adder 24, as described more fully hereinafter, through the second potentiometer 16.

It will be noted that each of the switches 11, 15 described hereinabove is a dual section switch. One section of each switch connects the battery 20 to the power supply voltage follower 21 and causes illumination of the LED 18. The other section of the switch controls delivery of the respective oscillator signal to the adder 24. That is, if either switch 11, 15 is "on," the other switch when "off" shorts the output of its corresponding oscillator to ground. Due to an isolation provided by the adder 24 to be described hereinafter, switching for one of the first and second oscillator means has no effect on the other of the oscillator means.

In order to make a useful two-tone test signal for procedures to be described hereinafter, the outputs of the first and second oscillator means must be combined or added. However, when the signals are added, a signal having twice the peak voltage results. In order to assure that the circuits do not have excessive loads imposed thereon, adding occurs through a voltage divider designed to assure that less than half the output voltage from each oscillator means is mixed to form an output from the adder which is less than the maximum that the adder can handle without distortion. However, the adder operates at a level sufficiently high so that the output signal is well above the noise level of the device used. Additionally, adjustment of the amplitude of the first and second signals is accomplished by using the potentiometers 12, 16 which form portions of that voltage divider.

Figure 3:
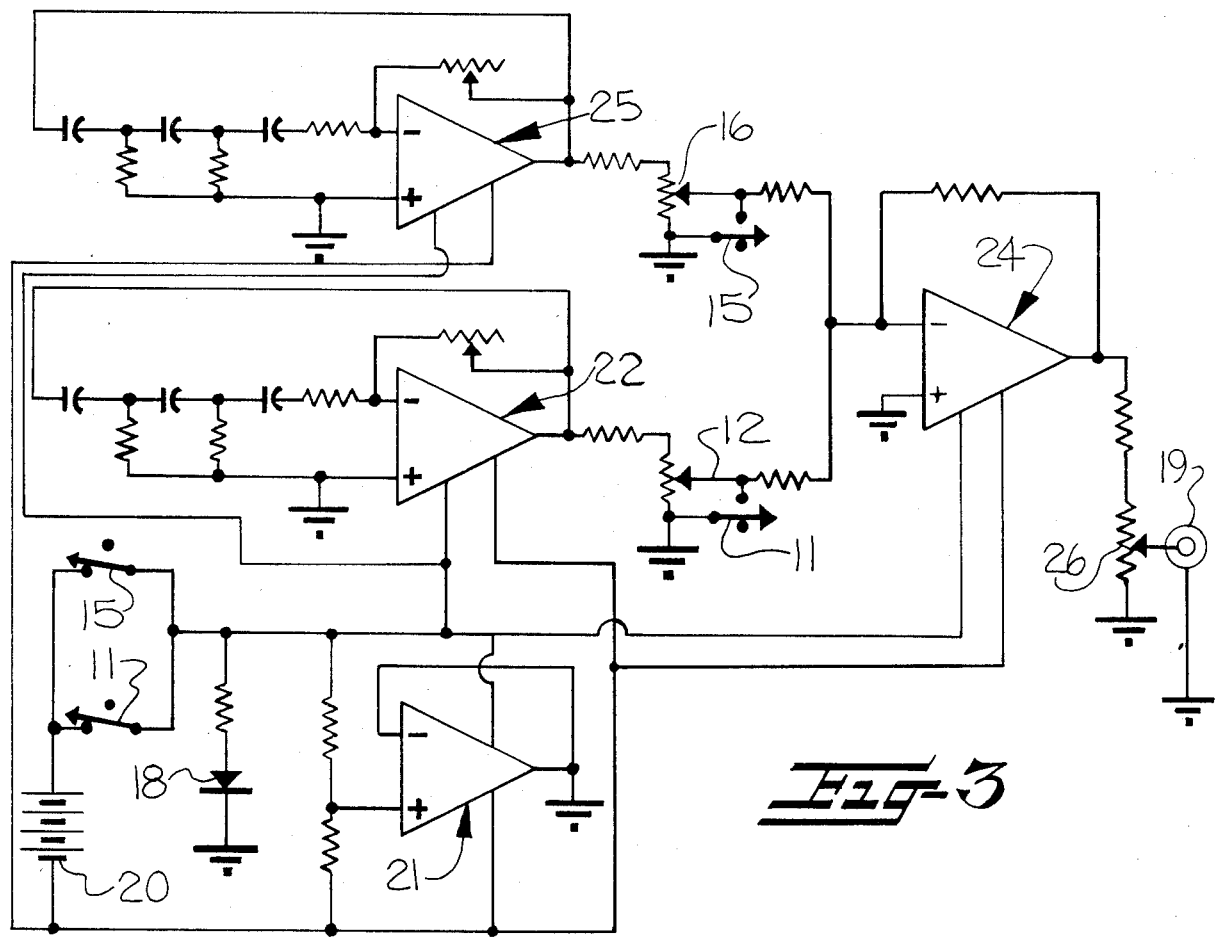
FIG. 3 is a schematic representation of circuitry contained within the apparatus illustrated in FIGS. 1 and 2.

As will be appreciated, such oscillator means audio tone signals as reach the adder 24 are delivered through the output thereof to the connector 19 for coupling into a transmitter as will be described more fully hereinafter. Between the output of the adder 24 and the connector 19 is provided an amplitude adjustment potentiometer 26 to permit matching the output signal to a particular transmitter. It is preferred that the output potentiometer 26 be accessible only within the housing 10, in order that adjustment of that potentiometer be made relatively inaccessible. It is contemplated that adjustment of the potentiometer 26 would be required only upon an initial matching of the apparatus of FIGS. 1 through 3 with a transmitter.

Figure 4:
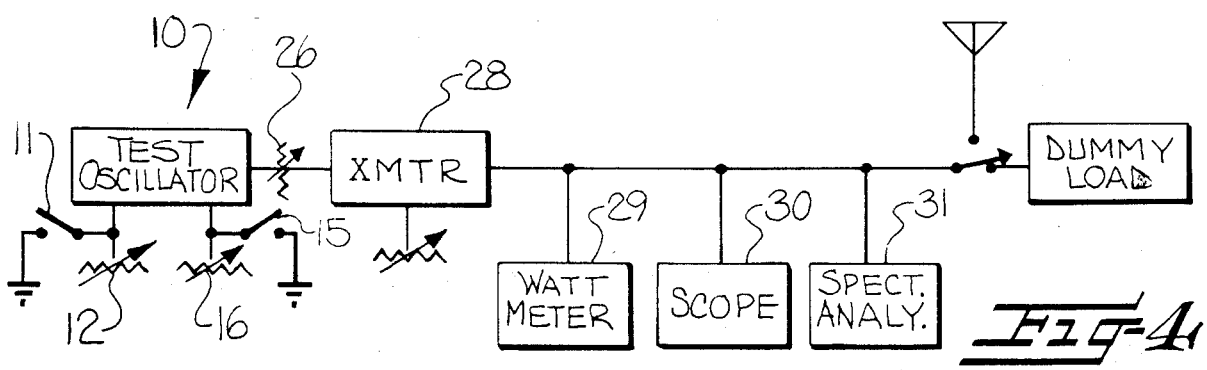
FIG. 4 is a block diagram showing the interconnection of the apparatus of FIGS. 1 through 3 with a single sideband radio transmitter.

Referring now more particularly to FIG. 4, a block diagram representation is there given of a single sideband transmitter 28 with which the oscillator apparatus 10 of the present invention may be employed. As indicated, the transmitter 28 may have a radio frequency output to a dummy load or to an antenna. The radio frequency output may also be made available to one or more of a wattmeter 29, an oscilloscope 30, or a spectrum analyzer 31. Each of the devices 29, 30, 31 may be used in determining the linearity of the output of a single sideband radio transmitter 28 in accordance with the present invention.

More particularly, the oscillator apparatus 10 of the present invention may be connected to the microphone input of the transmitter 28 by means of the connector 19. Thereafter, if necessary, both oscillators may be turned on and the output amplitude control 26 adjusted to determine that the transmitter 28 is not overdriven by the test oscillator 10. Once such an adjustment is made, then the determination of the linearity of the output of the transmitter 28 may go forward. That determination includes the steps of activating the transmitter 28 in a single sideband mode, and then turning on the first oscillator by actuation of the corresponding switch 11. The first tone amplitude control potentiometer 12 is then adjusted to adjust the amplitude of the first frequency signal applied to the transmitter 28 until such time as the transmitter output as measured by one or more of the devices 29, 30, 31 is a selected fraction of the rated transmitter output, for example, one-fourth. In connection with such a determination, it is to be noted that the usual radio frequency wattmeter indicates average power rather than peak envelope power, as such, though the two may be said to be the same in the limited case where the supplied audio signal is of pure, single frequency, sinusoidal form. When such an adjustment is completed, the first oscillator is switched off.

The second oscillator means is then switched on, and the second tone amplitude control means 16 adjusted for the same transmitter output referred to above. During these adjustments of the first and second tone amplitude controls 12, 16, the adder output potentiometer 26 is not changed.

Thereafter, both oscillator means are switched on to supply through the adder 24 and connector 19 both the first and second audio tone signals. When such signals are applied, the average output power of the transmitter 28 should double if the transmitter is linear. Should an oscilloscope 30 be employed, the peak-to-peak deflection of the wave form viewed should be twice that of the wave form viewed during delivery of either of the first and second signals alone.

If the average output power from the transmitter 28 is not, when under such test, doubled, then the transmitter has been determined to be nonlinear. If the transmitter average output power is doubled, then the transmitter has been determined as possibly being linear. For a final determination of linearity, the oscilloscope 30 or the spectrum analyzer 31 may be used in order to examine the wave form and search for the presence of undesired frequencies. Should either the wave form or the presence of undesired frequencies indicate nonlinearity or the like, then corrective measures may be applied to the transmitter as required.

In the procedure described above, it is to be noted that data is provided concerning transmitter performance at normal peak envelope power. Tests may be run at lower or higher transmitter output powers by readjusting the signal output control 26 or the microphone gain (drive) control of the transmitter 28.

Testing may proceed, then, to determine the extent of linearity or non-linearity over the entire useful power range of the transmitter. Of course, in each instance of making such determination, the ratio between peak envelope power and average power for non-sinusoidal drive signals must be kept in mind so as not to exceed transmitter limitations, as must the transmitter input power, so as not to exceed, for example, the one kilowatt legal limit for amateur band transmitters.

The two-tone test signal, properly adjusted, produces an average output power from the transmitter that is twice the average power obtained from a single tone, as described above. However, due to the nature of the two-tone waveform, the peak-envelope power (PEP) produced by this waveform is four times the average power produced by a single tone. Thus in making a determination of linearity at normal PEP rating of the transmitter, each tone must be set to one fourth the PEP transmitter rating. Note, then, that for the undistorted two-tone signal, the PEP produced is twice the average power as read by a wattmeter.

In the drawings and specifications, there has been set forth a preferred embodiment of the invention, and although specific terms are employed, they are used in a genereic and descriptive sense only and not for purposes of limitation.

That which is claimed is:

1. A method of determining the linearity of a single sideband radio transmitter and comprising the steps of:
    generating a first audio tone signal having a first frequency and delivering the first signal to a transmitter, then
    monitoring the output of the transmitter while adjusting the amplitude of the first signal to produce from the transmitter a selected fraction of rated power output, then
    interrupting delivery of the first signal to the transmitter, then
    generating a second audio tone signal having a second frequency separated from the first frequency by a predetermined frequency range approximating a frequency range of human speech and delivering the second signal to the transmitter, then
    monitoring the output of the transmitter while adjusting the amplitude of the second signal to produce from the transmitter the same selected fraction of rated power output, then
    simultaneously generating and delivering to the transmitter the adjusted amplitude first and second signals while monitoring the output of the transmitter to determine the power output as indicative of the linearity of the transmitter across the predetermined frequency range.

2. A method according to claim 1 wherein said frequency range approximates 500 Hertz.

3. A method according to one of claim 1 or claim 2 wherein said first frequency is about 1300 Hertz.

4. A method according to one of claim 1 or claim 2 wherein said second frequency is about 1800 Hertz.

5. A method according to claim 1 wherein the last-mentioned step of monitoring comprises sensing the transmitter output with a radio frequency wattmeter.

6. A method according to one of claim 1 or claim 5 wherein the last-mentioned step of monitoring comprises sensing the transmitter output with an oscilloscope.

7. A method according to one of claim 1 or claim 5 wherein the last-mentioned step of monitoring comprises sensing the transmitter output with a spectrum analyzer.

* * * * *